(12) United States Patent
Mannepalli et al.

(10) Patent No.: US 9,212,920 B1
(45) Date of Patent: Dec. 15, 2015

(54) SYSTEM AND METHOD FOR REAL TIME OPTIMIZATION OF DRIVING DIRECTIONS

(75) Inventors: Rao Y. Mannepalli, Deptford, NJ (US); Joseph E. Uzdzinski, Cherry Hill, NJ (US)

(73) Assignee: Lockheed Martin Corporation, Bethesda, MD (US)

( * ) Notice: Subject to any disclaimer, the term of this patent is extended or adjusted under 35 U.S.C. 154(b) by 580 days.

(21) Appl. No.: 12/686,838

(22) Filed: Jan. 13, 2010

(51) Int. Cl.
   *G01C 21/34* (2006.01)
   *G01C 21/36* (2006.01)

(52) U.S. Cl.
   CPC ............ *G01C 21/34* (2013.01); *G01C 21/3691* (2013.01)

(58) Field of Classification Search
   None
   See application file for complete search history.

(56) References Cited

U.S. PATENT DOCUMENTS

| | | | |
|---|---|---|---|
| 4,301,506 A | 11/1981 | Turco | |
| 4,926,336 A | 5/1990 | Yamada | |
| 5,041,983 A | 8/1991 | Nakahara et al. | |
| 5,172,321 A | 12/1992 | Ghaem et al. | |
| 5,539,645 A | 7/1996 | Mandhyan et al. | |
| 5,878,368 A * | 3/1999 | DeGraaf | 701/411 |
| 6,236,933 B1 | 5/2001 | Lang | |
| 6,282,489 B1 | 8/2001 | Bellesfield et al. | |
| 6,317,686 B1 | 11/2001 | Ran | |
| 6,477,526 B2 | 11/2002 | Hayashi et al. | |
| 6,873,908 B2 * | 3/2005 | Petzold et al. | 701/414 |
| 7,054,745 B1 | 5/2006 | Couckuyt et al. | |
| 7,133,771 B1 * | 11/2006 | Nesbitt | 701/533 |
| 7,216,034 B2 * | 5/2007 | Vitikainen et al. | 701/533 |
| 7,236,881 B2 * | 6/2007 | Liu et al. | 701/533 |
| 7,239,962 B2 * | 7/2007 | Plutowski | 701/533 |
| 7,319,931 B2 * | 1/2008 | Uyeki et al. | 701/423 |
| 7,356,405 B1 * | 4/2008 | Nesbit | 701/533 |
| 7,437,240 B2 * | 10/2008 | Oumi et al. | 701/533 |
| 7,440,843 B2 * | 10/2008 | Yoshikawa et al. | 701/117 |
| 7,474,960 B1 | 1/2009 | Nesbitt | |
| 7,590,488 B2 * | 9/2009 | Tu | 701/414 |
| 2002/0147541 A1 | 10/2002 | Trovato | |
| 2005/0021225 A1 | 1/2005 | Kantarjiev et al. | |
| 2005/0131634 A1 | 6/2005 | Ignatin | |
| 2007/0299599 A1 | 12/2007 | Letchner et al. | |
| 2008/0004802 A1 | 1/2008 | Horvitz | |
| 2008/0033632 A1 | 2/2008 | Lee | |
| 2008/0234927 A1 | 9/2008 | O'Neill | |

(Continued)

OTHER PUBLICATIONS

"Dijkstra's Algorithm", http://en.wikipedia.org/wiki/Dijkstra's_algorithm, 2009.

(Continued)

*Primary Examiner* — Redhwan K Mawari
*Assistant Examiner* — Edward Torchinsky
(74) *Attorney, Agent, or Firm* — Howard IP Law Group, PC

(57) ABSTRACT

A system and method for generating driving directions is disclosed. The system and method comprise generating a series of instructions to guide a driver along a route that includes a sequence of roads and intersections. The system uses real time or near real time information culled from one or more databases to calculate and display a time-efficient route based on current weather conditions, traffic conditions, road closures, construction, and the like. The system can also incorporate one or more driver preferences in calculating the displayed route. The system also can provide a summary of the rationales used in calculating the displayed route so the user can understand the basis for a particular route's presentation. A method is also disclosed for using the system.

18 Claims, 9 Drawing Sheets

(56) References Cited

U.S. PATENT DOCUMENTS

2009/0118996 A1  5/2009  Kantarjiev et al.
2009/0204320 A1  8/2009  Shaffer et al.
2009/0271104 A1  10/2009  Letchner et al.

OTHER PUBLICATIONS

"Shortest Path Problem", http://en.wikipedia.org/wiki/Shortest_path, 2009.
Brochure entitled "NAVTEQ Traffic Patterns", 2008.

* cited by examiner

SYSTEM AND METHOD FOR REAL TIME OPTIMIZATION OF DRIVING DIRECTIONS

FIELD OF THE INVENTION

The invention relates to generating driving directions using computer algorithms. More specifically, the invention relates to computer-generated driving directions that minimize the impact of weather, traffic conditions, road closures, construction and the like, on travel efficiency.

BACKGROUND OF THE INVENTION

Travelers often take a variety of approaches to navigate between a trip's origin and destination. Either as a supplement for a map or as a replacement, a person who is familiar with a route often composes driving instructions from memory and communicates them to a driver. The driver uses a written copy of the instructions as a guide to following the route. While the human based approach to navigation has benefits, it has significant limitations. In many cases, a driver simply cannot access anyone with familiarity of a route or a particular destination. And while human based driving instructions are usually the easiest to follow by a driver, frequently humans can remember or describe routes inaccurately. Human-generated instructions can be susceptible to human error. And, since individual perception is subjective, the quality and consistency of human-generated instructions can vary greatly.

As an alternative to the human based driving directions or instructions, computers can routinely generate driving instructions via conventional technologies. Commercial sources, including Internet websites and stand-alone software packages, offer a driver a list of instructions, or a driving itinerary, between one location and another. Conventional computer-generated driving instructions are generally more consistent than human-generated instructions. And with the recent proliferation of mobile computing and Internet technologies, computer-generated driving instructions are reasonably accessible in many driving situations.

Referring now to FIG. 1, an exemplary computer-generated map 1 is shown, including a proposed highlighted route 2 between two geographic points 4, 6. A set of textual, turn-by-turn, directions 8 is provided adjacent to, or overlying, a portion of the map that provide instruction to a driver about the individual turns required to navigate the highlighted route 2. FIG. 2 shows the map 1 of FIG. 1 with additional graphical information indicating regions of relative traffic slowness due to general congestion (as indicated by color key 10), construction zones 12, and road closures and detours 14, all of which may impact driving times. Maps and driving directions of this type can be created using well-known software such as Google™ maps, Yahoo!® LOCAL Maps, MapQuest®, and the like.

Computers conventionally derive these driving directions from commercially available databases that contain the geographic location of roads and intersections in a region. Conventional mapping software generates a route between user-selected start and destination points by processing the commercial database. The software typically displays a route by highlighting it on a traditional map and displaying the highlighted map through a user interface. To accompany the map, conventional software can generate textual driving instructions with what can be referred to as an itinerary module.

While conventional mapping systems are easily accessible and generally produce acceptable directions, such systems may not consider current conditions (i.e., conditions existing at the time of the trip) that can substantially impact the amount of time it will take to traverse the presented route. Rather, existing systems are often used to obtain directions for use at some point in the future (e.g., directions obtained on Friday afternoon for a trip beginning the following Monday morning). In addition, existing systems use static routing, which does not take dynamic conditions (e.g., traffic delays due to volume, weather conditions such as snow, sleet, rain, construction delays, and the like) into consideration. More often than not, the real travel time is very different from the duration estimated by these conventional systems. Indeed, many conventional systems include a disclaimer along with their directions, indicated that construction projects, traffic, weather or other events may cause conditions to differ from the mapped results.

As noted, ever changing factors such as bad weather, accidents, lane closures, general construction, rush hour, and the like can substantially affect the time required for the user to travel from point to point along the route. If such factors were considered, the total trip time could be reduced simply by making changes to (i.e., avoiding) the affected portions of the route.

It would, therefore, be desirable to provide a system that considered a plethora of real-time factors to calculate the most efficient route for a user to follow. It would also be desirable to provide a system that informs the user of the rationale for presenting a particular route, so that the user can further customize the route based on personal preferences.

SUMMARY OF THE INVENTION

A method for providing driving directions for a trip, comprising: obtaining a start point for a trip; obtaining an end point for the trip; obtaining a start time and a start date for the trip; obtaining and storing traffic volume information in a database; obtaining and storing information representing potential causes of delay in said database; constructing a graph of a plurality of potential routes linking the start point to the end point, wherein the graph comprises a plurality of nodes and a plurality of links connecting the nodes; assigning a weight to each of said plurality of links based on the stored traffic volume information and the stored potential causes of delay; applying a shortest path algorithm to obtain a proposed route of said plurality of potential routes; and displaying the proposed route to the user on a display.

A system for providing driving directions for a trip, comprising a processing unit connected to and in communication with a database and a display, and a machine-readable storage medium encoded with a computer program code such that, when the computer program code is executed by a processor, the processor performs a method comprising: obtaining a start point for a trip; obtaining an end point for the trip; obtaining a start time and a start date for the trip; obtaining and storing traffic volume information in a database; obtaining and storing information representing potential causes of delay in said database; constructing a graph of a plurality of potential routes linking the start point to the end point, wherein the graph comprises a plurality of nodes and a plurality of links connecting the nodes; assigning a weight to each of said plurality of links based on the stored traffic volume information and the stored potential causes of delay; applying a shortest path algorithm to obtain a proposed route of said plurality of potential routes; and displaying the proposed route to the user via the display.

BRIEF DESCRIPTION OF THE DRAWINGS

These and other features and advantages of the present invention will be more fully disclosed in, or rendered obvious by, the following detailed description of the preferred embodiment of the invention, which is to be considered together with the accompanying drawings wherein like numbers refer to like parts, and further wherein.

DETAILED DESCRIPTION

A system and method are disclosed for enhancing computer calculated driving directions by incorporating dynamic predictive traffic patterns during the computation. The disclosed system and method enable a user to realistically plan for a trip by taking a number of dynamic factors into account in calculating a proposed route. Examples of such dynamic factors include dynamic traffic patterns, weather related delays, construction delays, as well as the number (and time-of-day characteristics of) intervening traffic control devices. The accuracy and usefulness of the resulting directions will be substantially improved over those obtained using static information.

In addition to providing a proposed set of driving directions, the system and method can provide the user with an explanation of how the directions were calculated. For example, the system can identify to the user that a particular route has been selected due to a traffic accident identified on another, perhaps shorter, route. Providing this level of detail to the user will result in increased user confidence in the system.

Thus, in addition to the accepting the start and end points of a user's proposed trip, the system and method can include additional input points, which can include the start date and start time for the trip. Using this information, the system uses a set of predicted conditions to calculate a proposed trip route. A non-limiting example of such predicted conditions may include traffic patterns, weather effects, and construction delays associated with each of a plurality of possible routes. These conditions may be used to adjust "weights" associated with each leg in the trip to result in a proposed route to obtain the shortest predicted travel time, or the shortest travel distance.

The proposed route can then be displayed in a graphical form, along with a presentation of the assumptions used in calculating the path (e.g., traffic, accidents, inclement weather) and their impact on the trip time. A separate window may be provided to display this rationale to the user, or the information can be displayed in a window overlying a portion of the graphical route display.

Figure 1:
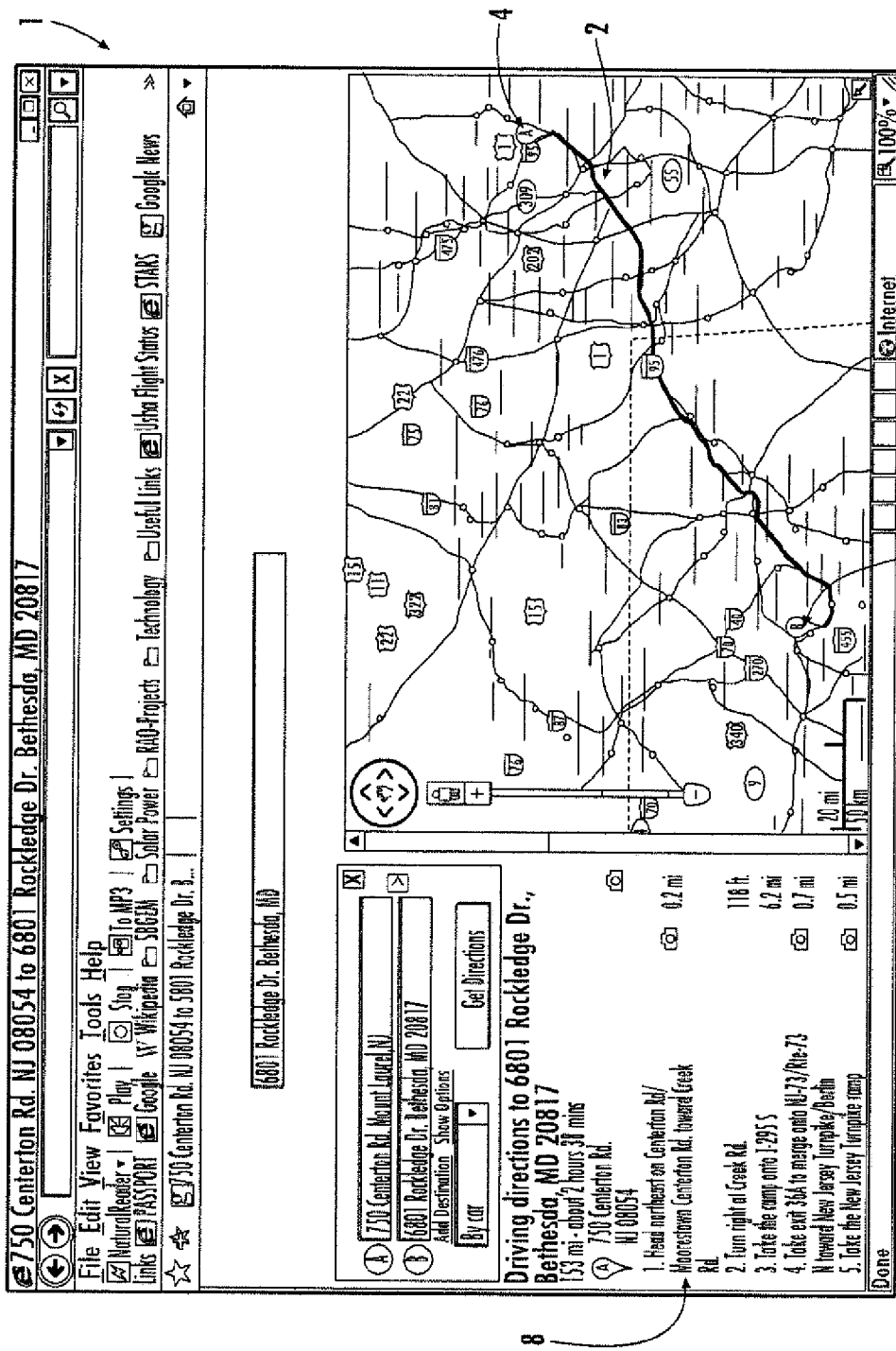
FIG. 1 is an exemplary map including a proposed highlighted travel route between two geographic points.
Figure 2:
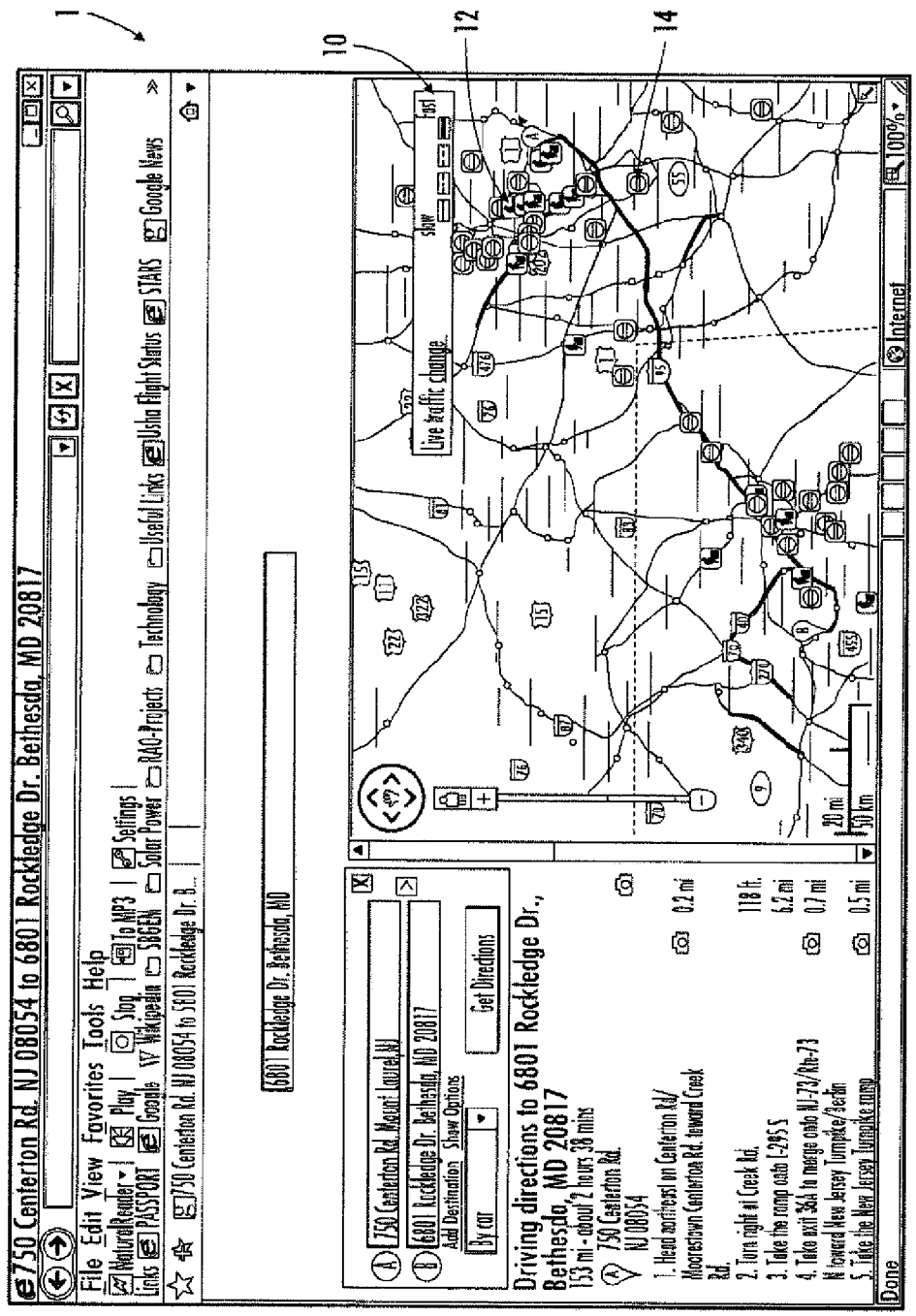
FIG. 2 shows the map of FIG. 1 incorporating graphical features to indicate regions of congestion, construction and road closures.
Figure 3:
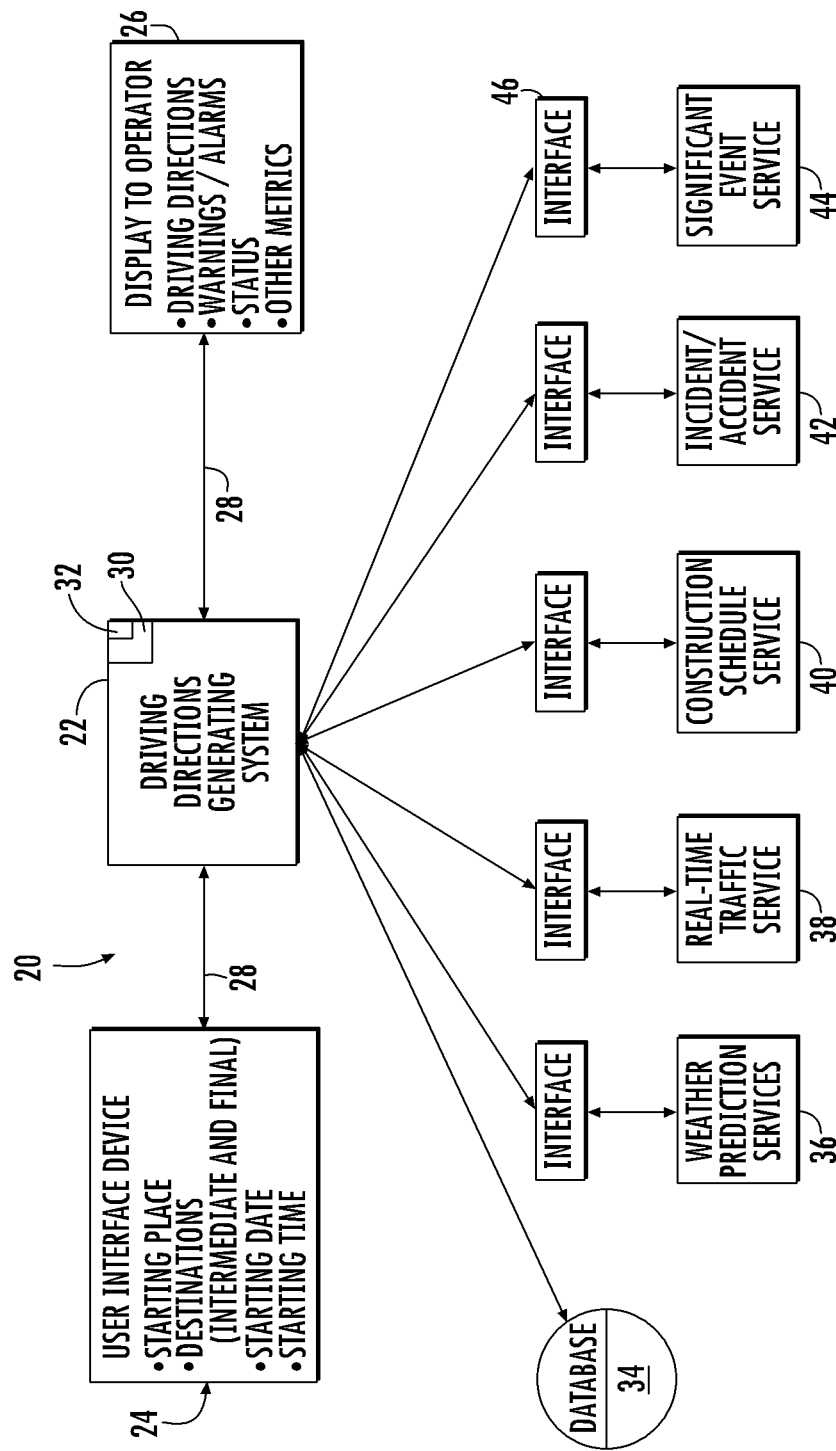
FIG. 3 is a diagram of the disclosed system.

Referring to FIG. 3, the disclosed system 20 may comprise a driving directions generating system 22 in communication with a user interface device 24 and an operator display device 26. Communications links 28 between the driving directions generating system 26 and the interface and display devices 24, 26 may be hard wired or wireless connection types. A non-limiting list of exemplary technologies making up the communication link includes analog or digital phone lines, fiber optic lines, T1 or T2 lines, public/private networks, wireless (Radio Frequency (RF)), cellular and/or satellite connections. In addition, a portion of the communication link 28 may be a public or private network (e.g., the Internet).

The user interface device 24 may comprise any of a variety of devices that enable a user to input information such as starting place, intermediate and final destination(s), starting date and starting time, into the driving directions generating system. A non-limiting list of exemplary devices include desktop computers, laptop computers, personal digital assistants (PDAs), and cell phones, and the like. In addition to obtaining input information directly from the user interface device 24, the system may take input directly from the database 34. An example of this is where the user has selected and saved route details in the database for future use. In such case, the database 34 can be an input and/or output device.

The operator display device 26 may be any of a variety of output or display devices, such as printers or graphical display devices (e.g., computer screens, cell phone screen, PDA screen), suitable for displaying the calculated driving directions, warnings/alarms, status, or other metrics to the user. As previously noted, the database 34 can be used as an output device, where a user selects and saves routing details for future use.

The driving directions generating system 22 may comprise a processor 30 with a local or remote memory 32. The system 22 may be configured to receive information from a variety of sources that can be used to build and update a database 34 of information that can be used by the system 22 to develop a set of driving directions. The sources from which the system 22 may receive such information include a weather prediction service 36, a real-time traffic information service 38, a construction schedule service 40, an incident/accident service 42, and a significant event service 44. The directions generating system 22 may be connected to one or more of these services via an appropriate interface 46. Examples of such interfaces include hard wired or wireless public or private networks (e.g., the Internet).

The weather prediction service 36 may provide the system 22 with information relating to predicted weather patterns that may affect travel times along segments of a selected route. Thus, if the user's travel plans include a route that traverses a geographic area for which heavy weather (e.g., rain, snow) is predicted for the time period during which the user will be travelling that route, such information is provided to the system for use in determining the recommended route. In one exemplary embodiment, the weather prediction service 36 is a Really Simple Syndication (RSS) feed from the Weather Channel.

The real-time traffic service 38 may provide the system 22 with information relating to traffic volumes (e.g., rush hour, off-peak, weekend) associated with each portion of a potential route at particular times of day. The construction schedule service 40, may provide the system 22 with information relating to on-going and scheduled construction events associated with each portion of a potential route, again, tied to the time during the day/night at which the construction is scheduled to occur. In one exemplary embodiment, the real-time traffic service 38 is an RSS feed from NAVTEQTraffic.com.

The incident/accident service 42 may provide information relating to immediate incidents (e.g., road block, traffic stop) or accidents associated with each portion of a potential route. The significant event service 44 may provide the system 22 with information regarding scheduled events (e.g., presidential inauguration, football game) that can impact the travel time along portions of a potential route. In one exemplary embodiment, the real-time incident/accident service 42 is SmartTraveler.com.

In general, the driving directions generating system 22 may obtain information from one or more of these services, and may use that information to generate and/or update information contained in the database 34. Updates to the database 34 may be periodic, or they may be based on other criteria. In one embodiment, the database is updated using information from one or more of the services every 15 minutes). The timing of updates is not critical, and thus the system 22 can obtain updates as frequently as needed in order to obtain a desired level of accuracy. In one embodiment the system 22 updates the database based on a standard deviation analysis. In another embodiment, the system uses Chauvenet's criterion and/or Pierce's criterion to eliminate statistically significant data samples from the database.

Maintaining the database with current information enables more accurate driving directions to be provided to the user. Thus, whenever a user requests the system 22 to provide driving directions, the system can utilize the most current data available to it in calculating a recommended driving route.

Figure 4:
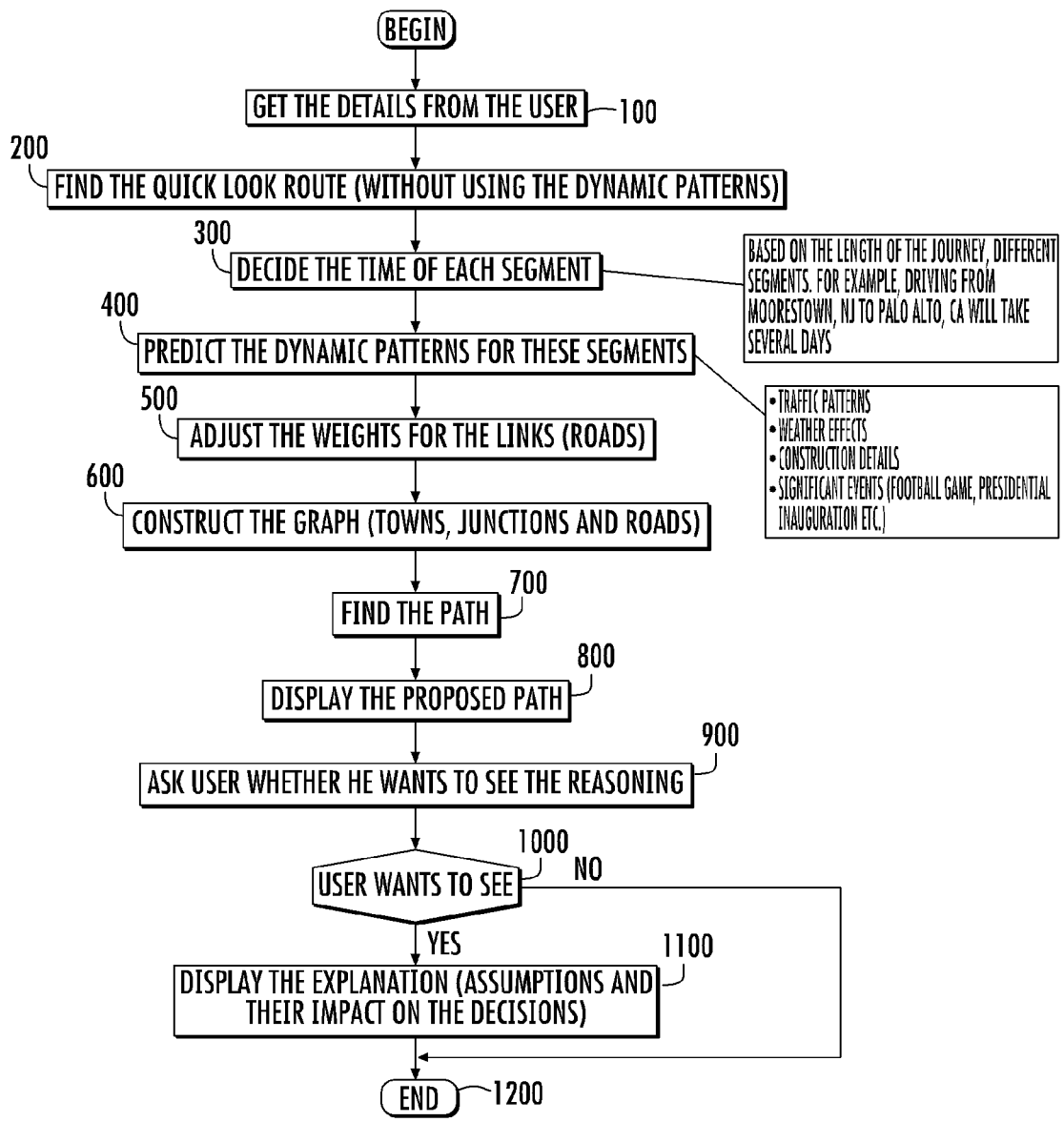
FIG. 4 is flow chart of a method for generating driving directions.

Referring to FIG. 4, the method may begin at step 100, where the user inputs travel information from the user interface device 24. This travel information should include at least the trip start and end points, and the trip start date and start time of day. At step 200, the system obtains a "Quick Look Route" obtained without using any of the dynamic pattern information contained in the database 34. This "Quick Look Route" may be obtained using a technique such as that described in U.S. Pat. No. 7,372,816 to Mannepalli, et al., and U.S. Pat. No. 6,842,425 to Mannepalli et al., the entirety of which patents are incorporated herein by reference.

At step 300, the route is divided into a plurality of segments, and a time for each segment is determined. Based on the length of the journey, each segment of a route may be subject to traffic patterns, etc. that occur at different times of day. For example, driving from New Jersey to California will take several days, and thus, each segment of the route will be encountered by the user at a different time of day and/or different day of the week.

At step 400, the dynamic patterns are predicted for each of the plurality of segments identified in step 300. These dynamic patterns will include traffic patterns (volume), weather effects, construction details, and significant events data, as previously described.

At step 500, weights are assigned to each of the plurality of segments identified in step 300. The weights are assigned to each of the segments based on the dynamic pattern information (obtained from the database 34) that relates to each segment. At step 600, a graph of a suggested route is constructed. The graph includes towns, junctions, and roads that are part of the suggested route.

At step 700, the system finds the path by dividing the route into a plurality of nodes (i.e., junctions) and links (i.e., road segments), and apply a well known shortest path algorithm such as Dijkstra's algorithm. At step 800, the suggested route is displayed to the user via the operator display device 26. At step 900 the system 22 sends an inquiry to the user asking if the user would like to be provided with an explanation of the rationale of why the particular route is suggested. At step 1000, if the user elects to display the rationale, then at step 1100 an explanation is displayed, including a listing and/or description of the underlying assumptions and their impact on routing decisions. If the user elects not to display the rationale, then the method ends at step 1200, and the user can save the suggested route and/or print the route for use.

Figure 5:
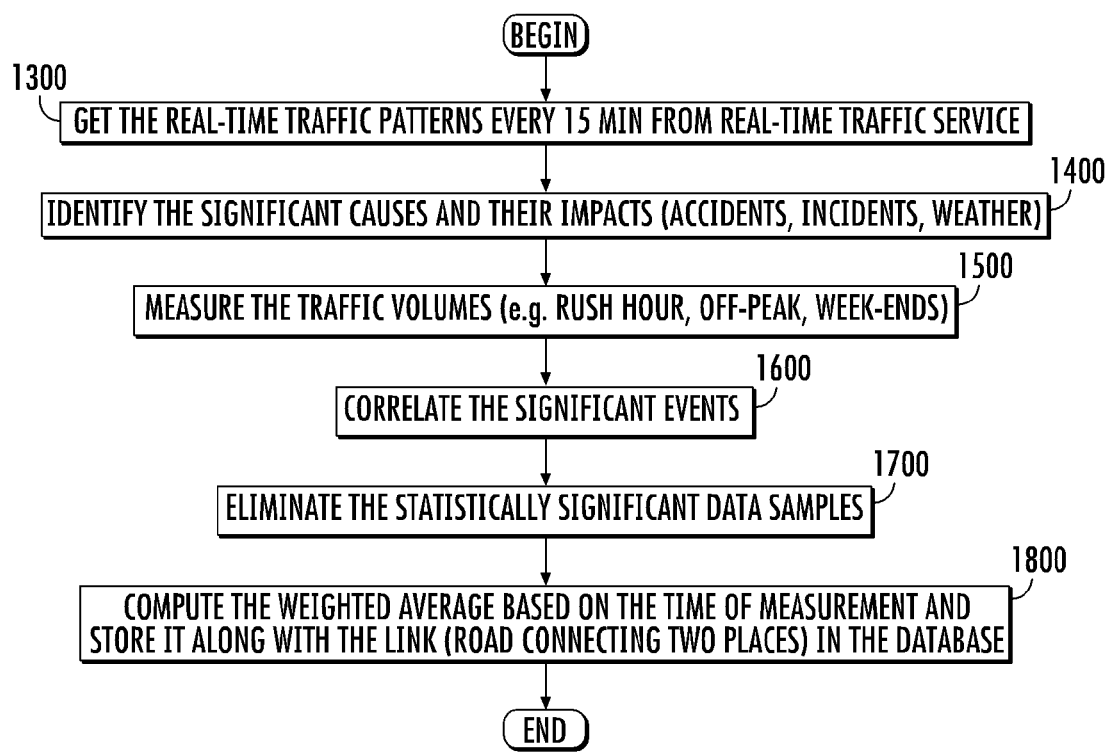
FIG. 5 is a flow chart of a method for maintaining a database of traffic details for use with the method of FIG. 4.

Referring to FIG. 5, a method for maintaining/updating the database 34 with recent traffic volume information is shown. At step 1300, the system 22 obtains real-time traffic patterns from the real-time traffic service 38. At step 1400, significant causes of delay (e.g., accidents, incidents, weather) are identified, along with their associated relative impacts. At step 1500, traffic volumes are measured (e.g., rush hour, off peak, weekends). At step 1600, significant events (e.g., football game, presidential inauguration) are correlated to determine whether the delay should be used to update the database 34. In one exemplary embodiment of this correlation step, the real time traffic service 38 may indicate that a stretch of I-76 between Mile 351 and Mile 340 will be seriously affected (e.g., delays of 30 minutes), that a stretch of I-295 between mile 25.0 and mile 30.0 will be moderately affected (e.g., delays of up to 10 minutes), and that a stretch of route R-42 between mile 15.0 and mile 12.0 will be moderately affected (e.g., delays of up to 15 minutes), and that the entire stretch of I-676 will be nominally affected (e.g., delays of less than 5.0 minutes). If these data points are within preselected statistical limits, then the data is stored in the database 34 and the driving times for those sections of roadway are updated. If these data points are not within the preselected statistical limits (i.e., they are determined to be outliers), then a root cause analysis is performed to determine the approximate epicenter of the event causing the delay. In the illustrated case, the Ben Franklin Bridge is determined to be the epicenter. Thus, the system 22 determines whether there are any accidents or incidents (e.g., construction or special events) that could be contributing to the specific delays. For example, there may be no accidents or incidents, but there may be a baseball game. In such a case, the driving times for the specific sections of roadway would not be updated in the database 34. The data would, however, be stored in the database 34 to compute predicted travel times in the future where travel will occur at the same time as a similar event (in this case, a baseball game). At step 1700, statistically significant data samples are eliminated using, for example Chauvenet's criterion, Pierce's criterion, or other appropriate technique. At step 1800, weighted averages of each link/segment are computed based on the time of measurement. For example, if 200 measurements exist in the database 34 relating to a particular route segment, and each has been provided to the system 22 by the a particular service on different days of the year, the more recent measurements will be given a higher weight than the older data. The weighted averages are stored, along with the link/segment, in the database 34.

Figure 6:
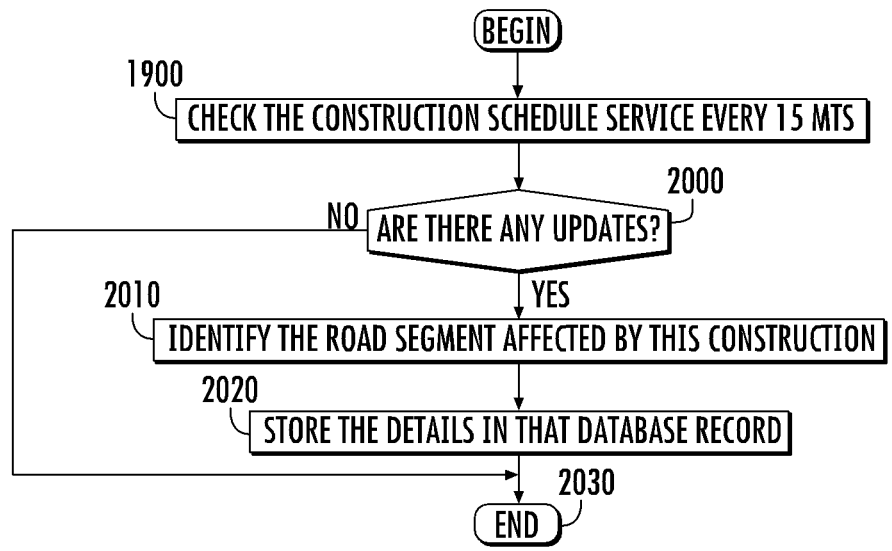
FIG. 6 is a flow chart of a method for maintaining a database of construction details for use with the method of FIG. 4.

Referring to FIG. 6, a method for maintaining/updating the database 34 with recent construction information is shown. At step 1900, the system 22 queries the construction schedule service 40. At step 2000, the system 22 determines if there are any updates to the construction information. If there are updates, then at step 2010, the road segment affected by the update is identified. At step 2020, the details regarding the construction update are associated with the road segment and stored in the database 34, and the method ends at step 2030. If no updates exist, then the method proceeds directly from step 2000 to step 2030.

Figure 7:
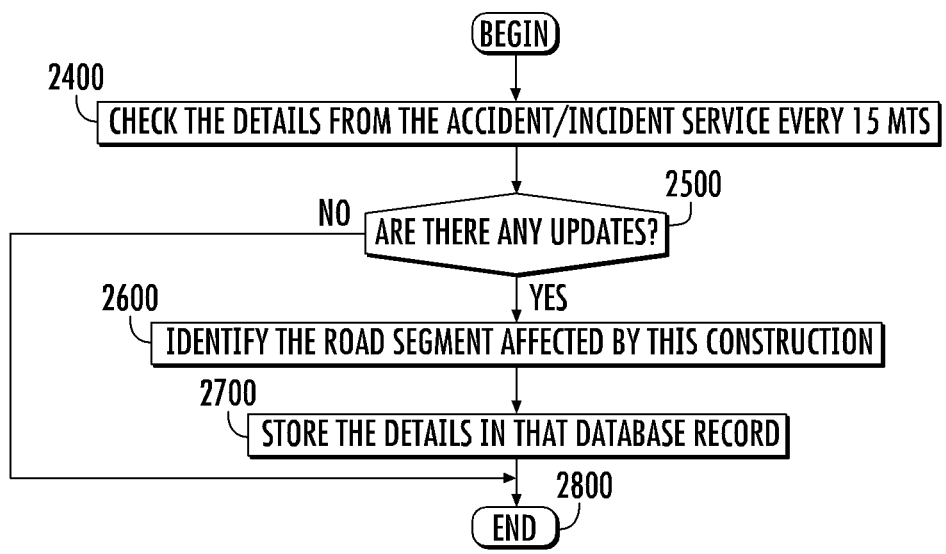
FIG. 7 is a flow chart of a method for maintaining a database of accidents and incidents details for use with the method of FIG. 4.

Referring to FIG. 7, a method for maintaining/updating the database 34 with recent accident/incident information is shown. At step 2400, the system 22 queries the incident/accident service 42. At step 2500, the system 22 determines if there are any updates to the incident/accident information. If there are updates, then at step 2600, the road segment affected by the update is identified. At step 2700, the details regarding the incident/accident update are associated with the road segment and stored in the database 34, and the method ends at step 2800. If no updates exist, then the method proceeds directly from step 2500 to step 2800.

In the illustrated embodiment, the steps of FIGS. 5-7 are repeated every 15 minutes, though, as previously noted, other periodicity values may be used.

Figure 8:
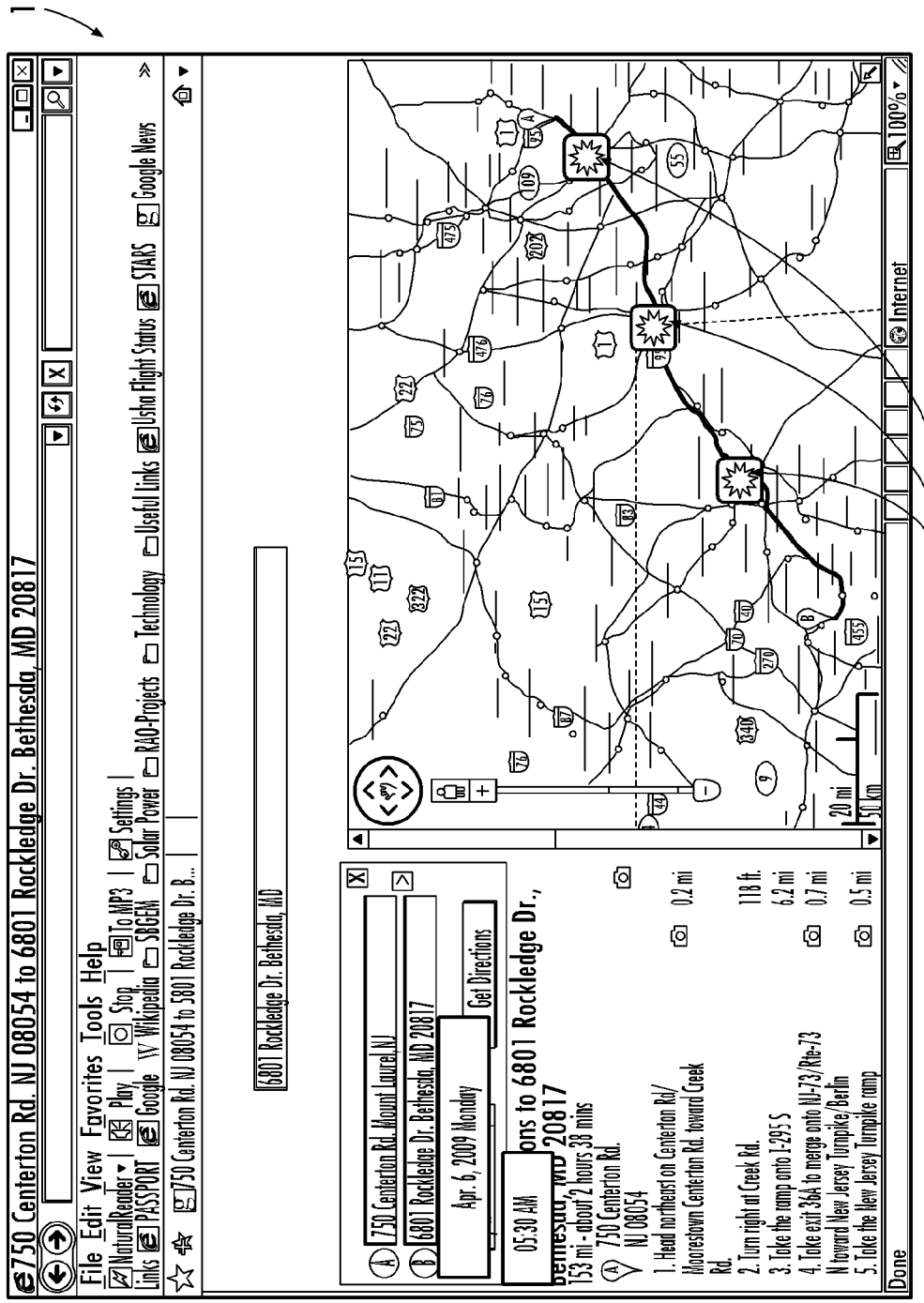
FIG. 8 is an exemplary screen shot of a map and route generated by the disclosed system and method of FIGS. 3 and 4.

FIG. 8 shows a route calculated using the disclosed method. The route is shown overlying an exemplary map. If there are any notes of explanation for route deviations, the affected section can be flagged with a pushpin icon 48 or other appropriate indicator. The icon may be provided as a link that the user can click in order to obtain the underlying explanation for the deviation.

Figure 9:
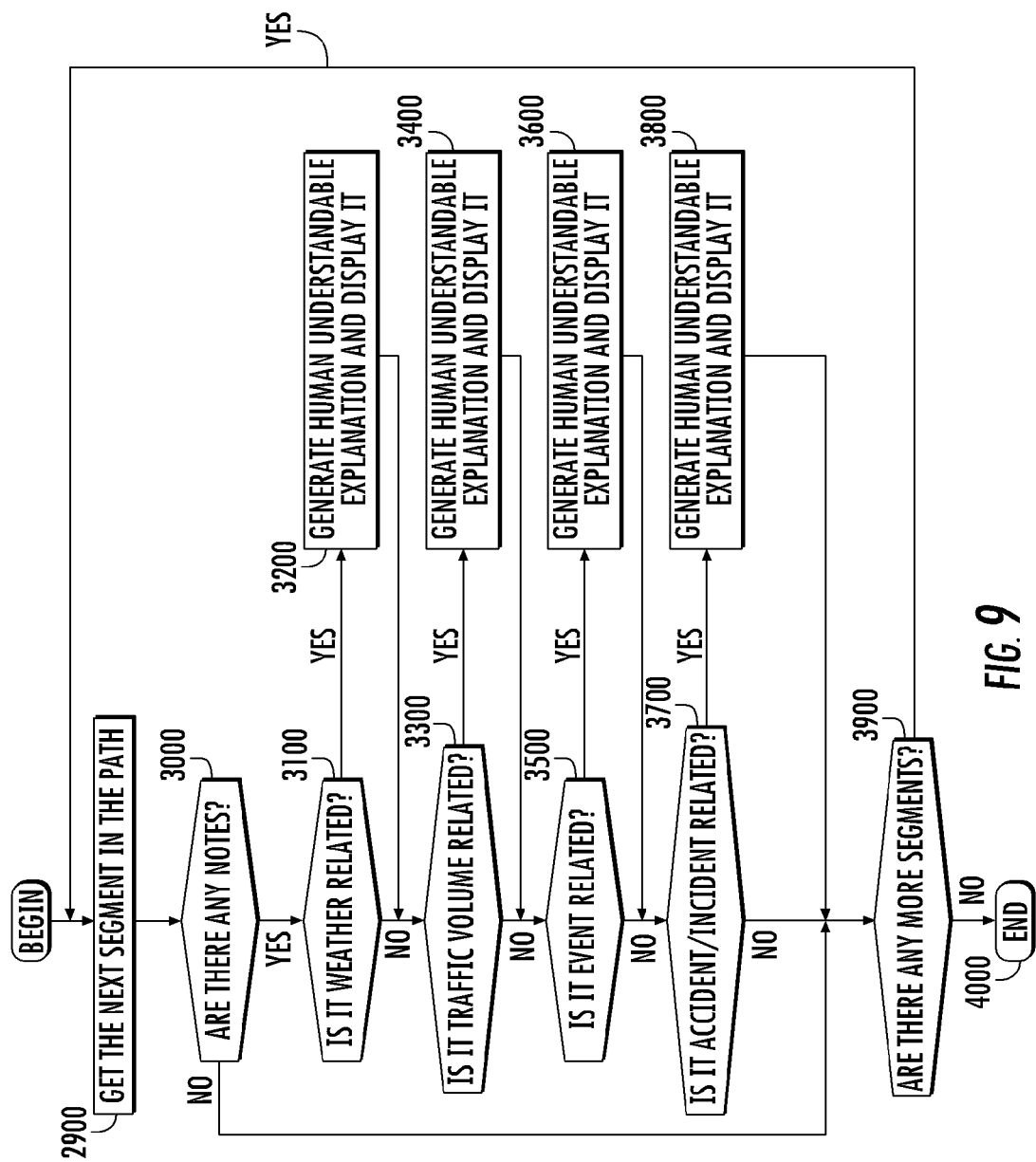
FIG. 9 is a flow chart of a method for producing a rationale behind a particular route generated using the method of FIG. 3.

As previously noted, the system 22 can provide the user with information about why a particular route has been suggested. For example, if substantial construction delays are predicted for a particular segment of a route, the system 22 may have selected an alternative segment or set of segments that ultimately provide the user with the most time-efficient route. Apart from mere curiosity, it may be important for a user to acknowledge the underlying computational rationale for a particular route to engender in the user a level of confidence with the system 22. FIG. 9 shows an exemplary method for generating a textual message that explains the rationale for selecting a particular route, and for displaying that message to the user via the operator display device 26.

At step 2900, a first segment in the suggested path is selected. At step 3000, the system 22 determines whether there are any "notes" associated with that segment. The notes will be customized to the particular route, and will provide sufficient information to enable the user to understand the rationale for the selection of a particular routing scheme. Thus, an exemplary note may read "Expected congestion between mile post 120.5 near Baltimore to mile post 170.5 in Richmond due to Presidential Inauguration." If notes exist for the segment, at step 3100, the system 22 determines if the note is weather related. If it is, then at step 3200, a human understandable explanation is generated and displayed on the operator display device 26. At step 3300, the system 22 determines whether a note exists that is traffic volume related. If one does exist, then at step 3400, a human understandable explanation is generated and displayed on the operator display device 26. At step 3500, the system 22 determines whether a note exists that is related to a "significant event". If one does exist, then at step 3600, a human understandable explanation is generated and displayed on the operator display device 26. At step 3700, the system 22 determines whether a note exists that is accident/incident related. If one does exist, then at step 3400, a human understandable explanation is generated and displayed on the operator display device 26. At step 3900, the system 22 determines if there are any more segments in the suggested route. If the answer is yes, then the system returns to step 3000 and determines whether any notes exist for that next segment. If there are, then it repeats steps 3100-3800 as noted above, and goes on to the next segment. When the system determines that there are no more segments or notes relating to the suggested route, the method ends at step 4000.

Figure 10:
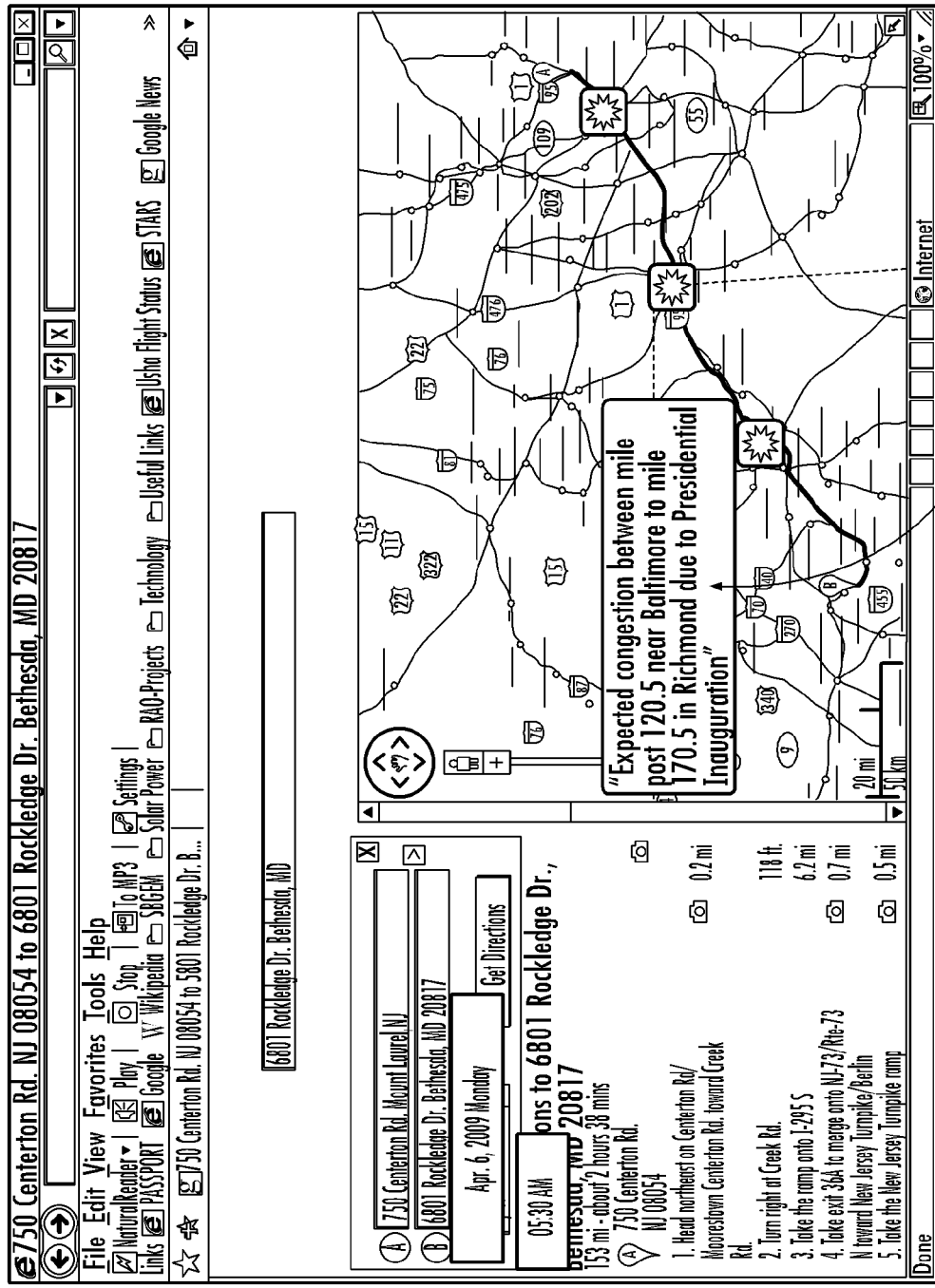
FIG. 10 is an exemplary informational window for use with the disclosed system and method of FIGS. 3 and 4.

FIG. 10 shows an informational window 50 that provides explanatory information, generated using the method of FIG. 9, regarding the fundamental assumptions used to calculate an exemplary suggested route. For example this window may contain information regarding construction or traffic delays that resulted in a longer route section selection. In the embodiment illustrated in FIG. 10, the informational window indicates that congestion between particular mile markers is due to the Presidential Inauguration.

The method described herein may be automated by, for example, tangibly embodying a program of instructions upon a computer readable storage media capable of being read by machine capable of executing the instructions. A general purpose computer is one example of such a machine. A non-limiting exemplary list of appropriate storage media well known in the art would include such devices as a readable or writeable CD, flash memory chips (e.g., thumb drives), various magnetic storage media, and the like.

The functions and process steps herein may be performed automatically or wholly or partially in response to user command. An activity (including a step) performed automatically is performed in response to executable instruction or device operation without user direct initiation of the activity.

The systems and processes of FIGS. 3-10 are not exclusive. Other systems, processes and menus may be derived in accordance with the principles of the invention to accomplish the same objectives. Although this invention has been described with reference to particular embodiments, it is to be understood that the embodiments and variations shown and described herein are for illustration purposes only. Modifications to the current design may be implemented by those skilled in the art, without departing from the scope of the invention. The processes and applications may, in alternative embodiments, be located on one or more (e.g., distributed) processing devices accessing a network linking the elements of FIG. 3. Further, any of the functions and steps provided in FIGS. 4-7 and 9 may be implemented in hardware, software or a combination of both and may reside on one or more processing devices located at any location of a network linking the elements of FIG. 3 or another linked network, including the Internet.

The features of the method have been disclosed, and further variations will be apparent to persons skilled in the art. All such variations are considered to be within the scope of the appended claims. Reference should be made to the appended claims, rather than the foregoing specification, as indicating the true scope of the disclosed system and method.

What is claimed is:

1. A method for providing driving directions for a trip, comprising:
    obtaining a start point for a trip;
    obtaining an end point for the trip;
    obtaining a start time and a start date for the trip;
    obtaining traffic volume information and updating a database with the traffic volume information;
    obtaining delay information representing potential causes of delay;
    correlating the delay information with preselected statistical limits to determine whether the delay information should be used to update the database;
    responsive to a positive determination, updating the database with the delay information;
    constructing a graph of a plurality of potential routes linking the start point to the end point, wherein the graph comprises a plurality of nodes and a plurality of links connecting the nodes;

assigning a weight to each of said plurality of links based on the stored traffic volume information and the potential causes of delay;

applying a shortest path algorithm to obtain a proposed route of shortest duration from said plurality of potential routes, wherein the proposed route includes selected segments and wherein at least one of the selected segments includes a note relating to a predicted delay identified on an unselected alternative segment to the at least one selected segment, based on one or both of the stored traffic volume information and the stored potential causes of delay;

reviewing the selected segments of the proposed route and generating a text explanation for each of the selected segments that includes the note relating to the predicted delay identified on the unselected alternative segment to the selected segment;

displaying to the user on the display a map of the proposed route; and displaying to the user, on the display of the map of the proposed route, for each of the selected segments having the note, the text explanation relating to the note, thereby providing the user a rationale for not selecting the unselected alternative segment instead of the selected segment.

2. The method of claim 1, wherein the step of obtaining the delay information representing potential causes of delay further comprises obtaining construction delay information.

3. The method of claim 1, where the step of obtaining the delay information representing potential causes of delay comprises using Chauvenet's criterion to eliminate statistically significant data samples.

4. The method of claim 1, where the step of obtaining the delay information representing potential causes of delay comprises using Peirce's criterion to eliminate statistically significant data samples.

5. The method of claim 1, wherein the step of assigning a weight to each of said plurality of links comprises assigning a weight dependent upon a time of day.

6. The method of claim 5, wherein a first link of said plurality of links is assigned a first weight associated with the start time of the trip, and a second link of said plurality of links is assigned a second weight associated with a time of the trip that is later than said start time.

7. The method of claim 6, wherein said second weight is associated with a date of the trip that is later than said start date.

8. The method of claim 1, wherein the display is a display on a device outside of the vehicle, and further comprising:

displaying to the user on the display an election of whether to display reasoning corresponding to the proposed route; and wherein displaying to the user the text explanation relating to the note is responsive to receiving an affirmative election to display the reasoning corresponding to the proposed route.

9. The method of claim 1, wherein correlating the delay information with the preselected statistical limits to determine whether the delay information should be used to update the database comprises:

determining whether the potential causes of delay corresponding to the delay information are within the preselected statistical limits;

responsive to a determination that the potential causes of delay corresponding to the delay information are within the preselected statistical limits, updating the database with the delay information including updating driving times corresponding to the delay information;

responsive to a determination that the potential causes of delay corresponding to the delay information are not within the preselected statistical limits:

performing a root cause analysis; and updating the database with the delay information based on the root cause analysis.

10. A system for providing driving directions for a trip, comprising a processing unit connected to and in communication with a database and a display, and a machine-readable storage medium encoded with a computer program code such that, when the computer program code is executed by a processor, the processor performs a method comprising:

obtaining a start point for a trip;

obtaining an end point for the trip;

obtaining a start time and a start date for the trip;

obtaining traffic volume information and updating a database with the traffic volume information;

obtaining delay information representing potential causes of delay;

correlating the delay information with preselected statistical limits to determine whether the delay information should be used to update the database;

responsive to a positive determination, updating the database with the delay information;

constructing a graph of a plurality of potential routes linking the start point to the end point, wherein the graph comprises a plurality of nodes and a plurality of links connecting the nodes;

assigning a weight to each of said plurality of links based on the stored traffic volume information and the potential causes of delay;

applying a shortest path algorithm to obtain a proposed route of shortest duration from said plurality of potential routes, wherein the proposed route includes selected segments and wherein at least one of the selected segments includes a note relating to a predicted delay identified, on an unselected alternative segment to the at least one selected segment, based on one or both of the stored traffic volume information and the stored potential causes of delay;

reviewing the selected segments of the proposed route and generating a text explanation for each of the selected segments that includes the note relating to the predicted delay identified on the unselected alternative segment to the selected segment;

displaying to the user on the display a map of the proposed route; and displaying to the user, on the display of the map of the proposed route, for each of the selected segments having the note, the text explanation relating to the note, thereby providing the user a rationale for not selecting the unselected alternative segment instead of the selected segment.

11. The system of claim 10, wherein the step of obtaining the delay information representing potential causes of delay further comprises obtaining and storing construction delay information.

12. The system of claim 10, where the step of obtaining the delay information representing potential causes of delay comprises using Chauvenet's criterion to eliminate statistically significant data samples.

13. The system of claim 10, where the step of obtaining the delay information representing potential causes of delay comprises using Peirce's criterion to eliminate statistically significant data samples.

14. The system of claim 10, wherein the step of assigning a weight to each of said plurality of links comprises assigning a weight dependent upon a time of day.

15. The system of claim 14, wherein a first link of said plurality of links is assigned a first weight associated with the start time of the trip, and a second link of said plurality of links is assigned a second weight associated with a time of the trip that is later than said start time.

16. The system of claim 15, wherein said second weight is associated with a date of the trip that is later than said start date.

17. The system of claim 10, wherein the display is a display on a device outside of the vehicle, wherein the machine-readable storage medium encoded with the computer program code further includes computer program code which, when executed by a processor, causes the processor to perform the steps of:
  displaying to the user on the display an election of whether to display reasoning corresponding to the proposed route; and
  wherein displaying to the user the text explanation relating to the note is responsive to receiving an affirmative election to display the reasoning corresponding to the proposed route.

18. The system of claim 10, wherein correlating the delay information with the preselected statistical limits to determine whether the delay information should be used to update the database comprises:
  determining whether the potential causes of delay corresponding to the delay information are within the preselected statistical limits;
  responsive to a determination that the potential causes of delay corresponding to the delay information are within the preselected statistical limits, updating the database with the delay information including updating driving times corresponding to the delay information;
  responsive to a determination that the potential causes of delay corresponding to the delay information are not within the preselected statistical limits:
  performing a root cause analysis; and
  updating the database with the delay information based on the root cause analysis.

* * * * *